(12) United States Patent
Buzanowski et al.

(10) Patent No.: US 7,383,850 B2
(45) Date of Patent: Jun. 10, 2008

(54) REAGENT INJECTION GRID

(75) Inventors: Mark A. Buzanowski, Carrollton, TX (US); Peter J. Burlage, Plano, TX (US); Dani Z. Fadda, Dallas, TX (US)

(73) Assignee: Peerless Mfg. Co., Dallas, TX (US)

( * ) Notice: Subject to any disclaimer, the term of this patent is extended or adjusted under 35 U.S.C. 154(b) by 133 days.

(21) Appl. No.: 11/038,010

(22) Filed: Jan. 18, 2005

(65) Prior Publication Data

US 2006/0157132 A1     Jul. 20, 2006

(51) Int. Cl.
    *G05D 11/03*     (2006.01)
(52) U.S. Cl. .......................................... 137/1; 137/896
(58) Field of Classification Search ................ 137/896, 137/1; 366/173.2, 181.6, 174.1, 337
See application file for complete search history.

(56) References Cited

U.S. PATENT DOCUMENTS

| | | | |
|---|---|---|---|
| 1,496,896 A | 6/1924 | Laffoon | 366/337 |
| 1,598,352 A * | 8/1926 | Kehoe, Jr. et al. | 239/222.19 |
| 1,901,954 A | 3/1933 | Fruth | 239/498 |
| 3,219,483 A | 11/1965 | Goos et al. | 127/28 |
| 3,494,712 A | 2/1970 | Vosper et al. | 239/432 |
| 3,734,111 A | 5/1973 | McClintock | 366/174 |
| 3,942,765 A | 3/1976 | Henrickson | 366/336 |
| 4,208,136 A | 6/1980 | King | 360/338 |
| 4,220,416 A | 9/1980 | Brauner et al. | 366/337 |
| 4,255,124 A | 3/1981 | Baranowski, Jr. | 366/338 |
| 4,296,779 A | 10/1981 | Smick | 366/337 |
| 4,401,626 A | 8/1983 | Lewis | 422/151 |
| 4,414,184 A | 11/1983 | Pinkston | 366/336 |
| 4,497,752 A | 2/1985 | Huber | 366/337 |
| 4,498,786 A | 2/1985 | Ruscheweyh | 366/336 |
| 4,538,529 A | 9/1985 | Temelli | |
| 4,564,298 A | 1/1986 | Gritters et al. | 366/167 |
| 4,573,803 A | 3/1986 | Gritters et al. | 366/173.2 |
| 4,633,909 A | 1/1987 | Louboutin et al. | 366/174 |
| 4,643,670 A * | 2/1987 | Edwards et al. | 431/202 |
| 4,744,313 A | 5/1988 | Hoskinson | |
| 4,753,535 A | 6/1988 | King | 366/167 |
| 4,812,049 A | 3/1989 | McCall | 261/76 |
| 4,820,492 A | 4/1989 | Wada et al. | 422/111 |
| 4,981,368 A | 1/1991 | Smith | 366/337 |
| 5,173,007 A | 12/1992 | Krajieck | 366/173 |
| 5,435,976 A | 7/1995 | Berner et al. | 422/168 |
| 5,456,533 A | 10/1995 | Streiff et al. | 366/173.1 |
| 5,518,311 A | 5/1996 | Althaus et al. | 366/181.5 |
| 6,135,629 A | 10/2000 | Dohmann | 366/181.5 |
| RE36,969 E | 11/2000 | Streiff et al. | 366/173.1 |
| 6,257,754 B1 | 7/2001 | Sandergaard | 366/174.1 |

(Continued)

FOREIGN PATENT DOCUMENTS

CH     581493     11/1976

(Continued)

*Primary Examiner*—Stephen M. Hepperle
(74) *Attorney, Agent, or Firm*—Andrews Kurth LLP

(57) ABSTRACT

An apparatus and process are disclosed for enhance mixing of a first fluid and an injected fluid. A turbulence edge (18) is formed on an element associated with an injection lance. The turbulence edge can be an edge (18a) of a square tubing lance (16), an angle (24) added to a circular tubing lance (10) or a clip (26) added to the circular tubing lance (10).

6 Claims, 3 Drawing Sheets

U.S. PATENT DOCUMENTS

| | | | |
|---|---|---|---|
| 6,779,786 B2 | 8/2004 | Ruscheweyh et al. | 261/79.2 |
| 2004/0037162 A1 | 2/2004 | Flohr et al. | 366/181.5 |

FOREIGN PATENT DOCUMENTS

| | | |
|---|---|---|
| DE | 2412454 | 7/1975 |
| DE | 30 38 875 | 6/1982 |
| DE | 3330061 | 2/1985 |
| DE | 8708201 | 12/1987 |
| DE | 37 12 039 | 10/1988 |
| EP | 0063729 | 11/1982 |
| EP | 1 462 747 | 9/2004 |
| FR | 2311578 | 12/1976 |
| FR | 2349424 | 11/1977 |
| GB | 798983 | 7/1958 |
| JP | 56118727 | 9/1981 |
| SU | 1315392 | 6/1987 |
| SU | 1368348 | 1/1988 |
| SU | 1498545 | 8/1989 |
| SU | 1604444 | 11/1990 |
| WO | WO 90/00929 | 2/1990 |
| WO | WO 03/004839 | 1/2003 |

\* cited by examiner

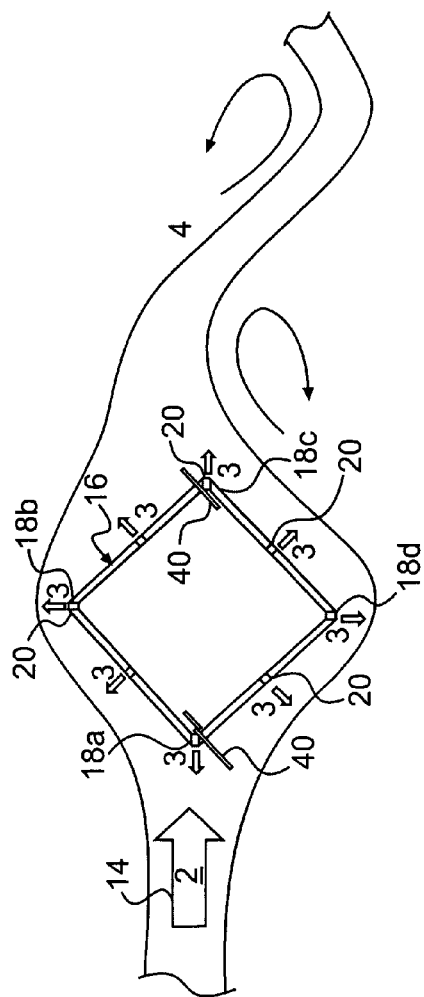
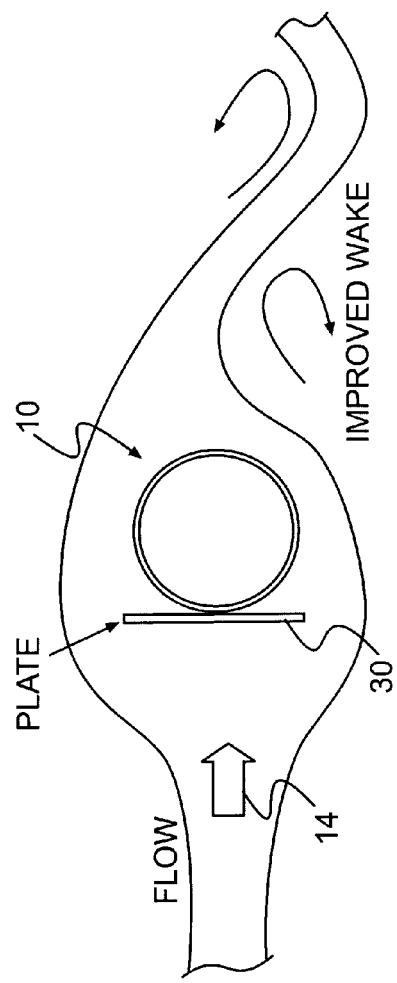

REAGENT INJECTION GRID

BACKGROUND OF THE INVENTION

Emissions of nitrogen oxides (NOx) contribute to adverse health and causes formation of ozone, acid rain, and particulates. One of the most efficient technologies commercially utilized to reduce NOx emissions is selective catalytic reduction (SCR). This technology utilizes a catalyst and reagent to reduce NOx to nitrogen (N2) and water (H2O).

Traditionally ammonia, as a reagent, is injected and distributed across a ductwork through a system of round pipes (lances) equipped with injection holes or injection nozzles. A long distance between the injection point and the SCR catalyst must be assured to allow for acceptable turbulent mixing of the reagent and flue gas. Shortening the distance between the injection point and the catalyst is desirable. In new construction, a long distance is often unavailable due to a limited footprint for the ductwork. In a retrofit application, a long distance may require cost prohibitive modifications to the existing system. To increase the mixing efficiency and reduce the required mixing distance (and the corresponding capital expenses) many SCR installation are equipped with static mixers. Static mixers typically have elaborate designs, high fabrication and installation costs, and they cause a significant pressure drop. The conventional static mixers are typically installed between the ammonia injection pipes and the SCR catalyst, however local deflectors attached to the injection nozzles or turbulence enhancers installed between the injection pipes have also been utilized.

A need exists to more effectively provide turbulent mixing between fluids such as ammonia and flue gas in a shorter distance and preferably without the need for a static mixer.

SUMMARY OF THE INVENTION

In accordance with one aspect of the present invention, a fluid mixing apparatus for mixing a first fluid with an injected fluid is provided. A first fluid flows through a passage with at least one injection lance extending generally transverse the direction of flow of the first fluid through the passage. The injection lance has a plurality of apertures along its length to inject the injected fluid into the flow of the first fluid. The apparatus includes an element having at least one turbulence edge associated with the injection lance to generate a turbulent wake to enhance turbulent mixing.

In accordance with another aspect of the present invention, the turbulence edge can be on the injection lance. The injection lance can be a square tubing lance with the turbulence edge formed by a sharp edge on the square tubing lance. The turbulence edge can be formed by an angle or a clip secured to the injection lance.

If a square tubing lance is used, the lance can be mounted to a square tubing header. The square tubing lance can have apertures at each of the sharp edges of the square tubing lance and between the sharp edges.

BRIEF DESCRIPTION OF THE DRAWINGS

A more complete understanding of the invention and its advantages will be apparent from the following Detailed Description, taken in conjunction with the accompanying Drawings, in which:

FIG. 7 is an illustration of a modification of the first embodiment of the present invention; and FIG. 8 is an illustration of the flow turbulence generated in accordance with a fourth embodiment of the present invention.

DETAILED DESCRIPTION

Figure 1:
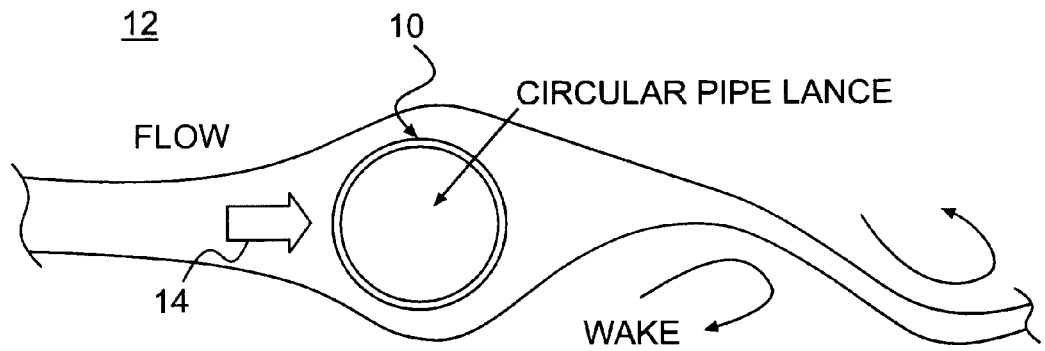
FIG. 1 is an illustration of the prior art flow.

With reference now to the figures, FIG. 1 discloses a conventional prior art technique for mixing an injected fluid supplied from an elongate circular pipe lance 10 into a first fluid 12 flowing in direction 14 within a passage, usually a duct. A series of apertures 20 along the length of the pipe lance 10 meter the injected fluid into the flow of the first fluid, where it is mixed with the first fluid in the wake. The first fluid can be flue gas and the injected fluid can be ammonia gas or other reducing agent such as urea.

A common use of this technique is the reduction of NOx in power plant flue gases by use of Selective Catalytic Reduction(SCR) technology. In the SCR process, ammonia must be mixed with the flue gas prior to the gas flowing over the catalyst to achieve the desired catalytic reaction. At the present time, ammonia is first injected into the flue gases and then the ammonia and flue gases are mixed in two separate stages. The present invention allows the ammonia to be simultaneously injected and mixed into the flue gas flow, increasing the efficiency of operation.

The ammonia is typically injected into the flue gases using an ammonia injection grid or AIG positioned in the flue gas flow. The AIG is upstream of the SCR catalyst. In using the design of FIG. 1, the AIG grid has utilized conventional circular pipe lances 10 with small holes along their length that release turbulent jets of diluted ammonia into the flue gas flow. This has required a long distance between the injection point and the SCR catalyst to allow for a complete turbulent mixing between the ammonia reagent and flue gas. To increase mixing efficiency and to reduce the required mixing distance, expensive static mixers have also been employed.

Figure 2:
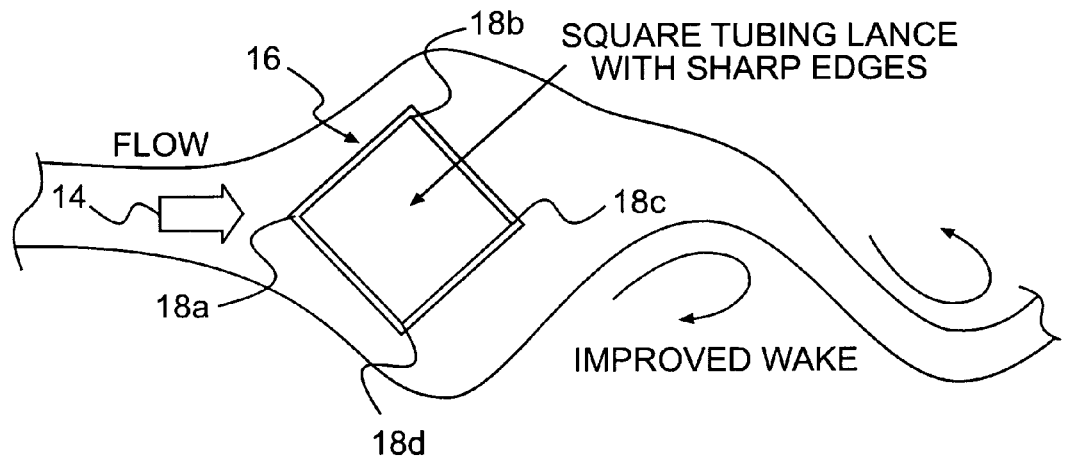
FIG. 2 is an illustration of the flow turbulence generated in accordance with a first embodiment of the present invention.
Figure 5:
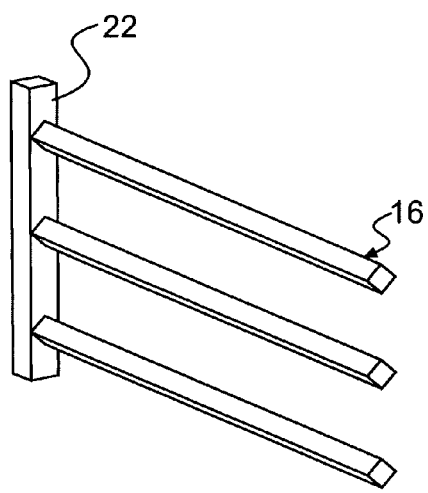
FIG. 5 is an illustration of the square tubing header and square tubing in the first embodiment of the present invention.

With reference to FIGS. 2 and 5, the first embodiment of the present invention will be described. Rather than the conventional circular pipe lances, at least one square tubing lance 16 is utilized. The square tubing lance 16 has four sharp edges 18a-d along its length and the lance 16 is oriented relative to the flow direction 14 such that the sharp edge 18a faces the oncoming flow of the first fluid 12. The apertures 20 to meter the injected fluid are preferably along the edge 18c facing away from the oncoming fluid flow.

It has been found, from numerical and empirical tests, that the turbulence edge formed by sharp edge 18a dramatically increases mixing efficiency and reduces mixing distance. The obtained numerical results, for the injection grid where round injection piping were replaced with square injection tubing, indicate over 50% reduction of the required mixing distance. This reduction corresponds to a substantially more compact ductwork and, therefore, significant capital cost reduction. Further, it is believed the pressure drop caused by using the turbulence edge will be about the same as present with the conventional lance 10, about 0.01 to 0.1 inches of water. In fact, the presence of the turbulence edge may even reduce pressure drop as compared to the conventional lance 10.

As seen in FIG. 5, square tubing headers 22 are preferably used with the square tubing lances 16 to simplify manufacturing the connection between the lances 16 and headers 22.

While square tubing lance 16 is shown to have a square cross-section, it will be understood that lance 16 can have any non-circular cross-section to form the desired turbulence edge, such as rectangular, triangular, hexagonal, ovoid, elliptical or any other suitable cross-section.

It is preferred that the edge of lance 16 forming the turbulence edge have a radius of curvature no greater than about twice the wall thickness of the lance 16. Commercially available square tubing has typical wall thicknesses that range from 3/16 to 5/16 inches, resulting in an edge radii of curvature from 3/8 to 5/8 inches. Square tubing having 3/16 wall thickness and edge radius of 3/8 inches was modeled for the CFD tests using the square lance with rounded edges discussed hereinafter. It is possible to achieve sharper edges by welding together two angles(as along lines 40 in FIG. 7) to form a square cross section lance 16. The edges at the ends of the legs of the angles are much sharper (ie have a much smaller radius of curvature) than are available on the typical commercially available square tubing and these sharper edges provide enhanced performance as shown in the tests. The square tubing lance with sharp corners in the CFD tests discussed hereinafter were modeled by two angles secured together to make the square tubing.

It should be understood that the sharp edge 18a need not point upstream and that the square tubing lance 16 can have any desired orientation to the flow of the first fluid 12 and still realize some of the advantages of the present invention. For example, the square tubing lance 16 can be oriented with the face of the lance 16 between two sharp edges facing upstream so that the sharp edges at the sides of the face form the turbulence edges.

Figure 3:
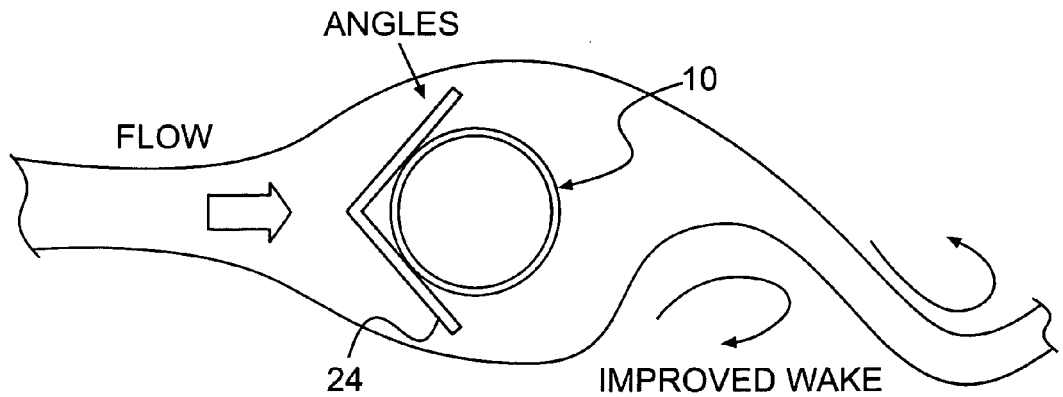
FIG. 3 is an illustration of the flow turbulence generated in accordance with a second embodiment of the present invention.

This invention can be applied to existing (or previously designed) circular pipe lances 10 or other lance shapes by attaching turbulence-enhancing sharp edges. FIG. 3 illustrates a second embodiment of the present invention where angles 24 are welded or otherwise secured to the upstream side of the lance 10 to create the turbulence edge. The angle 24 can be a continuous length angle extending for a portion of or the entire length of the lance 10, or discrete angle lengths positioned at intervals along the length of the lance 10. If discrete lengths, the individual angles 24 preferably are at the positions of the apertures 20 in the lance 10. The angle 24 will typically take the form as shown in FIG. 3 formed by a flat plate folded along its centerline at a 90 degree angle to form two equal width legs. However, angle 24 can have unequal length legs and can be oriented at other positions on lance 10 as desired.

Figure 4:
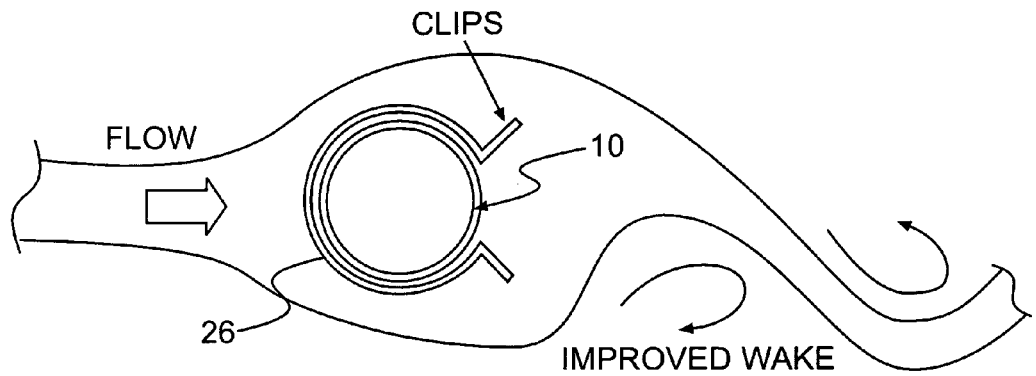
FIG. 4 is an illustration of the flow turbulence generated in accordance with a third embodiment of the present invention.

FIG. 4 illustrates a third embodiment of the present invention where clips 26 are welded, snap fit or otherwise secured to the upstream side of the lance 10 to create the turbulence edge. The clips 26 are preferably positioned on the lance 10 at the position of the apertures 20 in the lance 10.

FIG. 7 illustrates a modification of the first embodiment that illustrates that the apertures 20 can be formed at any position on the square tubing lance 16. As seen in FIG. 7, apertures can be formed at the sharp edges 18a-d and between the sharp edges 18a-d, both in the upstream direction and downstream direction relative to the flow direction 14.

FIG. 8 illustrates a fourth embodiment of the present invention where a flat plate 30 is secured to the circular pipe lance 10 on the upstream side thereof. The flat surface of the plate 30 facing the oncoming flow is preferably perpendicular the flow. The width of the plate can be about the same dimension as the diameter of the lance 10, or preferably somewhat greater. If desired, the plate 30 can be attached to lance 10 at other angles to the oncoming flow than shown in FIG. 10.

The present invention relates to a new process invention and new mixing equipment invention. The new process invention includes combining fluid injection and distribution in a confined duct with enhanced turbulent mixing. The equipment invention relates to employing the new process arrangement into a new simple and single device.

The complexity of mixing fluid streams results from the turbulent nature of the mixing process. Turbulence augments molecular transport and causes mixing within the fluid. Turbulent mixing is an important problem in technology. For example, distribution and mixing of ammonia with the post-combustion flue gas stream is critical to efficiently design the selective catalytic reduction installations in which catalyst is employed to control NOx emissions.

The invention presented here discloses a process where injection and distribution of ammonia is instantaneously coupled with enhanced turbulent mixing. As such, the mixing distance between the injection point and the SCR catalyst can be significantly shortened without the need for special nozzles or static mixers. In addition the proposed ammonia injection device is not causing any significant increase in pressure drop.

The equipment used to facilitate the process includes a cost effective substitution of currently used ammonia injection pipes coupled with injection nozzles with or without attached deflectors, or stand alone static mixers. Specifically, the round ammonia distribution pipe (FIG. 1) and any associated mixing hardware is replaced by a simple and cost effective injection lance equipped with at least one edge, such as e.g., a square tube (FIG. 2) or modified by adding structure such as angle 24 or clips 26.

Figure 6:
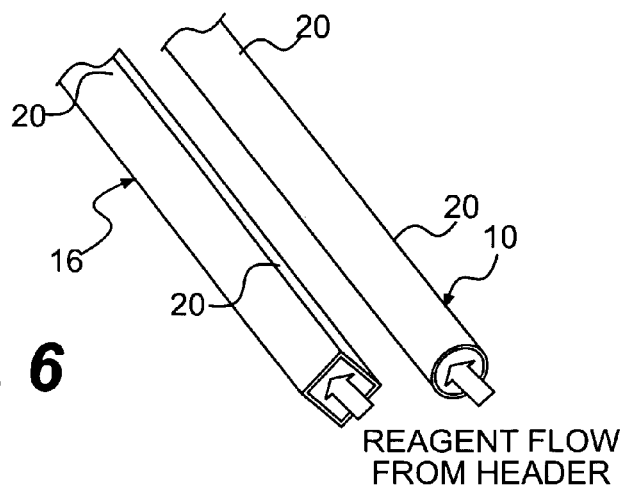
FIG. 6 is a comparison of the prior art circular pipe and the square tubing of the first embodiment of the present invention.

When compared to prior designs such as shown in FIGS. 1 and 6, the present invention has at least the following unique features:

The new injection and distribution device itself is a turbulence-generating device. No components are added while turbulent mixing is significantly improved.

The new device (square tubing) generates a turbulent wake in its immediate vicinity, starting at the point of reagent injection. Therefore, there is no contact between the reagent and any other device as experienced with static mixers.

The manufacturing process is simple. Holes are drilled into the square tubing and no manufactured nozzles or elaborate static mixer designs are used.

The invention is simple, cost effective, and readily available.

A CFD(computational fluid dynamics) study was performed to evaluate the effects of the lance shape on the injected fluid flow. Eight(8) two-dimensional and four(4) three-dimensional models were made. The CFD study is based upon numerical solutions for the full Navier-Stokes equations with the FLUENT brand computer model, version 6, of Fluent, Inc., of Lebanon N.H. Assumptions were made that the flow is steady and incompressible, the flow is isothermal, the velocity profile at the inlet is uniform and the defined computational grid for each model can accurately represent the geometry of the system.

The two dimensional model specified a two-dimensional 3 foot high duct. Three injection lances were used with the injected fluid injected uniformly through the surface of the three lances. Each lance was centered a distance of 12 inches from the adjacent lance so that 6 inches separated the outer lances from the walls of the duct.

The injection fluid was ammonia and the ammonia concentration RMS values from 1 to 8 feet downstream of the injection lances was computed. Different lance configurations were tested and the distance in feet from the lance to achieve the same RMS as a 2 inch diameter circular pipe lance used as the test reference achieved in 8 feet is presented below(the dimension of the square pipe lances is the distance between facing parallel sides):

| | |
|---|---|
| 2 inch diameter circular pipe lance | 8 feet |
| 2 inch square tubing lance with round corners | 6.5 feet |
| 2.83 inch diameter circular pipe lance | 5.8 feet |
| 2 inch square tubing lance with sharp corners | 4.0 feet |
| 3 inch square tubing lance with round corners | 3.5 feet |
| 3.69 inch square tubing lance with round corners | 2.4 feet |
| 3 inch square tubing lance with sharp corners | 2.3 feet |
| Two 3 inch by 3 inch angles welded at mid points | 1.6 feet |

The three dimensional model specified a three-dimensional 3 foot wide by 3 foot high duct. A single lance centered in the middle of the height and extending the entire width and having a single aperture to release the injection fluid was used.

The injection fluid was ammonia and the ammonia concentration RMS values from 1 to 8 feet downstream of the injection lances was computed. Different lance configurations were tested and the distance in feet from the lance to achieve the same RMS as a 3 inch diameter circular pipe lance used as the test reference achieved in 8 feet is presented below:

| | |
|---|---|
| 3 inch diameter circular pipe lance | 8 feet |
| 3 inch square tubing lance rounded edges | 7.1 feet |
| 3 inch square tubing lance sharp edges | 4.1 feet |
| Two 3 inch by 3 inch angles welded at mid points | 4.1 feet |

An experimental apparatus was constructed to validate the performance of this invention. The apparatus included a horizontal wind tunnel with 3 ft×3 ft cross-sectional area. The wind tunnel was equipped with one horizontal injection lance, installed at the mid-elevation of the duct, perpendicular to the flow. Diluted $SO_2$ was piped into the lance and was allowed to exit the lance through a single hole into the main flow of air in the wind tunnel. $SO_2$ concentration measurements are taken 8 ft downstream of the injection point. The results show a dramatic improvement in mixing with the square lance as compared to the original round lance. The results are as follows.

In a first test, a circular pipe lance with a 2.375 inch outside diameter was tested that had a single 0.145 inch aperture opening downstream(co-current flow) for discharge of the $SO_2$ and the duct $\rho V^2=46$ lb/ft–$s^2$ and Jet $\rho V^2=1364$ lb/ft–$s^2$.

In a second test, a square pipe lance with a 2 inch by 2 inch outside dimension(measured between facing flat surfaces) was tested that had a single 0.145 inch aperture opening downstream(co-current flow) for discharge of the $SO_2$ and the duct $\rho V^2=48$ lb/ft–$s^2$ and Jet $\rho V^2=1369$ lb/ft–$s^2$. A sharp corner of the square pipe lance faced upstream, as shown in FIG. 2.

In a third test, a circular pipe lance with a 2.375 inch outside diameter was tested that had a single 0.145 inch aperture opening vertically(cross flow) for discharge of the $SO_2$ and the duct $\rho V^2=47$ lb/ft–$s^2$ and Jet $\rho V^2=1375$ lb/ft–$s^2$.

Out of the entire 3 ft×3 ft wind tunnel cross-sectional area, a significantly larger portion was covered with diluent when the square lance was utilized. The maximum measured concentration and the concentration RMS deviation from the mean were significantly reduced.

| Test | Area covered with diluent Square Feet | Ratio of max to avg diluent concentration | Concentration RMS dev from the mean |
|---|---|---|---|
| 1 | 1.0 | 8.4 | 198% |
| 2 | 1.5 | 5.36 | 145% |
| 3 | 0.9 | 10.51 | 222% |

In a fourth test, a circular pipe lance with a 2.375 inch outside diameter was tested that had a single 0.125 inch aperture opening vertically(cross flow) for discharge of the $SO_2$ the duct $\rho V^2=53$ lb/ft–$s^2$ and Jet $\rho V^2=3018$ lb/ft–$s^2$.

In a fifth test, a straight plate 3 inches wide was positioned on the upstream side of the circular pipe lance from the fourth test with a flat side of the plate perpendicular the oncoming flow and the duct $\rho V^2=55$ lb/ft–$s^2$ and Jet $\rho V^2=2995$ lb/ft–$s^2$.

In a sixth test, a 3 inch by 3 inch angle mounted on the circular pipe lance of the fourth test as shown in FIG. 3 was tested and the duct $\rho V^2=52$ lb/ft–$s^2$ and Jet $\rho V^2=2987$ ft–$s^2$.

The results of the test were as follows:

| Test | Area covered with diluent Square Feet | Ratio of max to avg diluent concentration | Concentration RMS dev from the mean |
|---|---|---|---|
| 4 | 0.8 | 13.17 | 252% |
| 5 | 1.5 | 4.40 | 134% |
| 6 | 1.7 | 3.79 | 106% |

While several embodiments of the present invention have been illustrated in the accompanying drawings and described in the foregoing Detailed Description, it will be understood that the invention is not limited to the embodiments disclosed, but is capable of numerous rearrangements, modifications and substitutions of parts and elements without departing from the scope and spirit of the invention.

The invention claimed is:

1. A fluid mixing apparatus for mixing a first fluid with an injected fluid, the first fluid flowing through a passage, at least one injection lance extending generally transverse the direction of flow of the first fluid through the passage, the injection lance having at least one aperture along its length to inject the injection fluid into the flow of the first fluid, comprising:

an element having at least one turbulence edge associated with the injection lance to generate a turbulent wake to enhance turbulent mixing, wherein the injection lance is a square tube and wherein the element is a sharp edge on the square tube, and wherein the square tube has aperture at each of the sharp edges of the square tube and between sharp edges of the square tube.

2. The fluid mixing apparatus of claim 1 further including at least one square tubing header.

3. The fluid mixing apparatus of claim 1 wherein the injection lance and element form part of an injection grid.

4. The fluid mixing apparatus of claim 3 wherein the injection lance and element form part of an ammonia injection grid (AIG).

5. A method for mixing a first fluid with an injected fluid, the first fluid flowing through a passage, at least one injection lance extending generally transverse the direction of flow of the first fluid through the passage, the injection lance having at least one aperture along its length to inject the injection fluid into the flow of the first fluid, comprising the steps of:

forming an injection lance of square tubing;

positioning an element having at least one turbulence edge with the injection lance to generate a turbulent wake to enhance turbulent mixing, wherein the element is a sharp edge on the injection lance; and forming apertures in sharp edges of the square tubing and between the sharp edges of the square tubing.

6. The method of claim 5 further comprising the step of mounting the square tubing in a square tubing header.

\* \* \* \* \*